United States Patent [19]

Cyran et al.

[11] Patent Number: 4,588,569

[45] Date of Patent: May 13, 1986

[54] DRY INJECTION FLUE GAS DESULFURIZATION PROCESS USING ABSORPTIVE SODA ASH SORBENT

[75] Inventors: Michael J. Cyran, Gastonia, N.C.; William C. Copenhafer, Yardley, Pa.

[73] Assignee: Intermountain Research & Development Corporation, Green River, Wyo.

[21] Appl. No.: 704,105

[22] Filed: Feb. 21, 1985

[51] Int. Cl.$^4$ .................. C01B 17/00; B01J 8/00
[52] U.S. Cl. ........................ 423/244; 423/242
[58] Field of Search .......... 423/244 A, 244 R, 242 A, 423/242 R

[56] References Cited

U.S. PATENT DOCUMENTS

| | | | |
|---|---|---|---|
| 931,515 | 8/1909 | Sprague | 423/244 |
| 3,333,918 | 8/1967 | Gancy et al. | |
| 3,482,934 | 12/1969 | DiBello et al. | |
| 3,821,353 | 6/1974 | Weichman | 423/119 |
| 3,852,410 | 9/1974 | Rivers et al. | 423/244 |
| 3,868,444 | 2/1975 | Frevel et al. | 423/422 |
| 3,869,538 | 3/1975 | Sproul et al. | 423/206 |
| 3,880,629 | 4/1975 | Dulin et al. | 423/244 |
| 4,018,868 | 4/1977 | Knight | 423/244 |
| 4,062,926 | 12/1977 | Knight | 423/244 |
| 4,105,744 | 8/1978 | Erdoess et al. | 423/239 |
| 4,385,039 | 5/1983 | Lowell et al. | 423/242 |
| 4,424,197 | 1/1984 | Powell et al. | 423/244 |
| 4,481,172 | 11/1984 | Lowell et al. | 423/242 |

OTHER PUBLICATIONS

"New Developments in Flue Gas Desulfurization Technology", M. Satriana, editor, Noyes Data Corporation, Park Ridge, N.J., 1981, pp. 179-187, 190-194, 215-216.

ASTM Standard C699-72, Sections 106-114.

H. L. Ritter et al, *Ind. Eng. Chem. Anal. Ed.*, 17, 782-791 (1945).

S. Brunauer et al, *J. Am. Chem. Soc.*, 60, 309-319 (1938).

M. E. Kelly et al, "Third Survey of Dry SO$_2$ Control Systems", EPA-600/7-81-097 (Jun. 1981), pp. 1-13, 33-40.

L. J. Muzio et al, "Dry SO$_2$ Particulate Removal for Coal-Fired Boilers, vol. 2: 22 MW Demonstration Using Nahcolite, Trona & Soda Ash", *EPRI Report* CS-2894, vol. 2, Jun. 1984.

L. J. Muzio et al, "Bench-Scale Study of the Dry Removal of SO$_2$ with Nahcolite and Trona," *EPRI Report* CS-1744, Mar. 1981.

*Primary Examiner*—Gregory A. Heller
*Attorney, Agent, or Firm*—Christopher Egolf

[57] ABSTRACT

Hot flue gas containing sulfur oxides is treated in a dry injection desulfurization process by injecting a dry particulate soda ash sorbent into the SO$_2$-contaminated gas stream, which must contain 0.5-10 wt % water and be at a temperature of 100°-175° C., and collecting the sorbent in a solids collection device like a baghouse filter. The dry soda ash sorbent is a porous sodium carbonate, derived from calcination of a NaHCO$_3$-containing compound, and must have a minimum surface area of at least 2 m$^2$/g and less than 10 wt % residual bicarbonate. In this process, at least 40% of the sorbent's sodium content is utilized in the desulfurization reaction, at a normalized stoichiometric ratio=1.

25 Claims, 3 Drawing Figures

ns a flue gas desulfurization method that utilizes calcined compounds like calcined trona and calcined nahcolite as sorbents in a dry injection process which, contrary to the adverse disclosures of the prior art, nevertheless provides highly efficient removal of sulfur oxides from flue gas streams.

DRY INJECTION FLUE GAS DESULFURIZATION PROCESS USING ABSORPTIVE SODA ASH SORBENT

BACKGROUND OF THE INVENTION

1. Field of the Invention

This invention relates to the removal of sulfur oxides from a flue gas stream by injection of a dry soda ash sorbent into the hot gas stream. The absorptive soda ash sorbents used in this invention are porous calcines derived from $NaHCO_3$-containing compounds.

2. Description of the Prior Art

Dry sorbent injection is receiving increased attention as a method for removing sulfur oxides from the stack gases of coal-fired utility and industrial plants, especially those using low sulfur coals. Flue gas desulfurization (FGD) systems in commercial use are generally based on wet scrubbing or spray drying processes. Evaluations of dry sorbent injection, however, have revealed its advantages of operational simplicity and reliability, attractive equipment and labor costs, and lower water consumption, over the present conventional FGD systems.

In dry sorbent injection, a suitable sorbent is injected as a dry powder into a $SO_2$-containing flue gas stream and is then collected, along with fly ash in the hot flue gas stream, in a fabric filter baghouse.

Sulfur dioxide in the hot flue gas stream reacts with the injected sorbent, while the latter is fluidized in the ductwork and also when the flue gas passes through the baghouse-collected filter cake. The baghouse filter cake, a mixture of fly ash and sorbent-$SO_2$ reaction product, is periodically removed for disposal.

Sodium compounds are currently favored as dry injection sorbent candidates, with nahcolite (crude sodium bicarbonate) being described as more effective in $SO_2$-absorption than trona (crude sodium sesquicarbonate), but with soda ash (commercial sodium carbonate) being characterized as essentially ineffective for removing $SO_2$, as noted by M. E. Kelly et al. in their "Third Survey of Dry $SO_2$ Control Systems," EPA-600/7-81-097 (June 1981), and confirmed in a full-scale demonstration reported by L. J. Muzio et al. in "Dry $SO_2$ Particulate Removal for Coal-Fired Boilers, Vol. 2: 22-MW Demonstration Using Nahcolite, Trona, and Soda Ash," Electric Power Research Institute Report CS-2894, Volume 2, June 1984.

The parameters important in dry injection FGD procedures are still being investigated, and consequently the issued patents directed to this FGD technique are few in number and contain broad, generalized disclosures. U.S. Pat. No. 4,018,868 issued to Knight describes a dry injection process in which crushed nahcolite is utilized for removing sulfur dioxide from gas streams.

Other patent references contain disclosures suggesting the use of calcined nahcolite or of calcined trona for flue gas desulfurization because of the increased porosity that can result from decomposition of the bicarbonate or carbonate. These patents, like U.S. Pat. No. 3,821,353 issued to Weichman and U.S. Pat. Nos. 4,385,039 and 4,481,171 issued to Lowell et al., provide little specific information about the porosity characteristics of the calcines or about the effect of porosity-related parameters on the desulfurization performance of the calcined materials.

Still other patents which concern calcination of $NaHCO_3$-containing compounds like trona, typically for use in the "monohydrate" soda ash process, do not suggest that such calcines have any utility for flue gas desulfurization. U.S. Pat. No. 3,869,538 issued to Sproul et al. describes the use of a fluid bed calciner, in lieu of conventional rotary calciner, for processing trona in the monohydrate soda ash process.

Likewise, U.S. Pat. Nos. 3,333,918 and 3,482,934 issued to Gancy and DiBello describe the preparation of an "active sodium carbonate" intermediate from sodium bicarbonate, sodium sesquicarbonate, or sodium carbonate monohydrate, that is converted to a dense soda ash product; but there is no suggestion that either the dense soda ash or the intermediate would have utility in flue gas desulfurization.

Studies reported in the FGD literature indicate that calcination of $NaHCO_3$-containing compounds, to prepare FGD dry sorbents, is desirably avoided since the resultant calcines are not efficient FGD sorbents. In one evaluation of calcined nahcolite as a dry injection FGD agent, it was determined that the efficacy of calcined nahcolite was significantly less than that of uncalcined nahcolite or trona; see L. J. Muzio et al., "Bench-Scale Study of the Dry Removal of $SO_2$ with Nahcolite and Trona," Electric Power Research Institute Report CS-1744, March 1981.

In an effort to explain the poor performance of calcined sodium compounds, investigators researching the use of soda-type dry sorbents in dry injection FGD processes have noted that absorption of $SO_2$ from the gas stream (occurring both while the sorbent is fluidized in the gas stream and while deposited in the collected bag filter cake) appears to result in the progressive decline in the sorbent's $SO_2$ removal efficiency. L. J. Muzio, et al. in their previously-mentioned EPRI Report CS-2894 (in Section 5) speculate that pore plugging is the factor limiting the complete utilization of sodium in the dry sorbent, due to formulation of a barrier layer of reaction product, $Na_2SO_4$, through which $SO_2$ must diffuse in order to react with unreacted sodium (carbonate) in the sorbent.

These researchers accordingly believe that the best sorbents are uncalcined bicarbonate-containing compounds like nahcolite and trona. When used as sorbents in dry injection FGD, such uncalcined materials avoid premature pore plugging because of the bicarbonate decomposition reaction, evolving water and carbon dioxide, that occurs concurrently with the desulfurization reaction.

The present invention concerns a flue gas desulfurization method that utilizes calcined compounds like calcined trona and calcined nahcolite as sorbents in a dry injection process which, contrary to the adverse disclosures of the prior art, nevertheless provides highly efficient removal of sulfur oxides from flue gas streams.

SUMMARY OF THE INVENTION

In accordance with the present invention, an $SO_2$-containing flue gas stream is desulfurized in a dry injection process which involves injecting a dry soda sorbent, which is a particulate solid derived from calcination of a $NaHCO_3$-containing compound, into a $SO_2$-contaminated flue gas stream that contains moisture in an amount of 0.5–10 wt % $H_2O$ and is at a temperature of 100°–175° C.; providing an amount of injected sorbent and sufficient gas-sorbent contact time such that a substantial portion, at least 40%, of the sorbent sodium content is utilized at a NSR=1 in reducing the concentration of $SO_2$ in the gas stream; collecting the sorbent in a solids-collection device which is a fabric filter baghouse or an electrostatic precipitator; and discharging collected sorbent from the solids-collection device.

The dry soda sorbent used in this invention is characterized by being a porous calcine obtained from calcination of sodium sesquicarbonate, sodium bicarbonate, Wegscheider's salt or mixtures of these, and further characterized by having a minimum surface area of at least 2 $m^2/g$ and a residual bicarbonate content of less than 10 wt % $NaHCO_3$.

The dry soda sorbent may also be further characterized by its having a sufficient number of pores with radii in the size range of 800–2000 Å to provide a minimum surface area in such pores of at least 2 $m^2/g$ or, alternatively, by having a porous structure whose ratio of surface area to total pore volume is at least 9 $\mu m^{-1}$, preferably in the range of 10–35 $\mu m^{-1}$ and whose surface area is at least 2 $m^2/g$.

DETAILED DESCRIPTION

The dry injection process of this invention is designed to be adapted to an existing utility or industrial boiler operation, where removal of sulfur oxides from the $SO_2$-containing flue gas stream is desired. The process is intended to be implemented in such situations, without large capital outlays for equipment and without extensive modification of the existing operation.

The dry injection process is conventional in the respect that the dry sorbent is injected, or otherwise introduced, into the $SO_2$-containing hot flue gas stream, upstream of the point at which a solids collection device (baghouse filter, electrostatic precipitator, or the like) is located for removing entrained fly ash from the gas stream.

The dry sorbent is introduced into the flue gas at a point that is sufficiently far removed from (downstream of) the boiler combustion zone, so that the temperature of the flue gas stream is well below the sintering temperature for the injected soda-type sorbent.

It is also possible to pre-load or inject the sorbent into a solids collection device like a fabric filter baghouse, prior to its being contacted with the $SO_2$-containing gas stream. This mode of operation yields desulfurization performance comparable to direct injection of the sorbent into the gas stream and is intended to be covered by the claimed dry injection process.

The injected dry sorbent is collected, along with entrained fly ash, or otherwise deposited in the solids collection device so that the gas stream vented to the atmosphere is substantially solids-free.

The process of this invention is most suited for desulfurization of $SO_2$-contaminated flue gases from the combustion of low sulfur coal, i.e., containing about 2 wt % S or less. The flue gas from such low sulfur coal combustion ordinarily contains no more than 1 vol % $SO_2$. The amount of sulfur dioxide found in such gas streams is typically in the range of 0.01–0.5 vol % $SO_2$, and more commonly within the range of 0.02–0.2 vol % $SO_2$.

Present environmental regulations require removal of 70% of the $SO_2$ from flue gas streams from combustion of low sulfur coal (up to 1.3 wt % S). In other words, the treated gas stream must contain no more than 30% of its original sulfur dioxide content. At higher coal sulfur contents, the removal requirement increases, with up to 90% $SO_2$ removal being required.

The FGD process of this invention, it should be noted, could be readily adapted to treatment of high sulfur coal combustion gases, in a multistep procedure. First, a conventional wet or dry desulfurization process (e.g., limestone injection) would be used to remove a large portion of the $SO_2$ content of the gas stream. The present invention could then serve as a "polish" desulfurization step, downstream of the pretreated gas stream, with the dry injected sorbent being collected in a solids collection device like a fabric filter baghouse and being used to remove additional sulfur oxides, providing 90% $SO_2$ removal or more (based on the $SO_2$ levels of the untreated flue gas stream).

In the present invention, the inventors have unexpectedly discovered that the presence of water is absolutely essential for effective desulfurization performance of the dry calcined sorbent in their dry injection process. The desulfurization process is effective only when at least 0.5 wt % $H_2O$, up to about 10 wt % $H_2O$, and preferably, at least 1 wt % $H_2O$ up to 8 wt % $H_2O$, is present in the flue gas stream. An appropriate amount of water may be added to $SO_2$-containing flue gas streams that do not already contain the requisite level of moisture. This may be done by injection, upstream of the dry sorbent introduction point, or even at the same point where the dry sorbent is injected.

The maximum water level present in the flue gas should be maintained below the dew point amount for the moisture-containing gas stream (at gas temperatures during FGD treatment). This requirement minimizes the likelihood of water vapor condensing in the duct work or in the solids-collection device.

The inventors have also discovered that sorbent FGD performance in their invention is affected by the temperature during gas-solid contact. Temperature of the flue gas stream must be within the temperature range of 100°–175° C., preferably within 115°–165° C., and more preferably within 120°–150° C. The preferred temperature ranges of 115°–165° C. and of 120°–150° C. are particularly applicable to calcined sodium sesquicarbonate, whose FGD performance is more temperature sensitive than that of calcined sodium bicarbonate.

These temperatures of the flue gas stream may be determined at the point where the dry sorbent is contacted with the hot flue gas. The temperature may alternatively and more preferably be measured as the flue gas temperature at the solids-collection device, e.g., baghouse filter temperature. Baghouse temperatures for existing utility flue gas streams are ordinarily close to the preferred temperature ranges so that extraordinary heating/cooling measures are not required in the process of this invention. The dry sorbent, upon being introduced into the hot flue gas stream, becomes heated in a relatively short time to a temperature close to that of the flue gas stream.

For baghouse filter operations, the filter cycle time (maximum time in which the fly-ash/sorbent lies in the filter) should be within the range of 15 minutes to about 6 hours, with cycle times of 30 minutes to 3 hours being preferred.

For electrostatic precipitator operations, the cycle time may range from less than a minute up to about 30 minutes, and typically is from about 1 to 10 minutes.

After the cycle is completed, the collected hot solids (fly ash and sorbent) are discharged or removed from the device. The collected solids are ordinarily discarded or otherwise disposed of. The collection cycle is then repeated.

It should be noted that fabric filter baghouses are typically designed with multiple bag units, so that the gas stream is continuously filtered by bag filters in active use while other of the bags are emptied.

The dry injection process of this invention is preferably operated so that the solid sorbent is injected continuously into the hot gas stream, upstream of the solids collection device. Intermittent or semi-continuous injection of the dry sorbent is also feasible.

Performance of the calcined dry injection sorbents employed in this invention, like that of other FGD sodium sorbents, is generally measured by two of the following three criteria:

(i) sulfur dioxide removal efficiency—the requirement that a specified percentage, e.g., 70% or 90%, of the $SO_2$ content of the $SO_2$-containing flue gas stream be removed by FGD treatment with sorbent; $SO_2$ removal efficiency is readily calculated as $$\frac{\text{Amount } SO_2 \text{ removed from flue gas}}{\text{Amount } SO_2 \text{ in inlet flue gas}} \times 100$$

(ii) sodium utilization—the percentage of available sodium in the dry sorbent which is reacted with sulfur dioxide during the FGD treatment; "sodium utilization", sometimes referred to as "sodium efficiency," may be calculated as $$\frac{\text{Amount } Na_2 \text{ reacted with } SO_2}{\text{Amount } Na_2 \text{ present in injected sorbent}} \times 100$$

The third parameter is related to the first two performance criteria:

(iii) normalized stoichiometric ratio (NSR)—a measure of the overall reaction stoichiometry during the FGD treatment process; normalized stoichiometric ratio may be calculated as $$\frac{SO_2 \text{ Removal Efficiency, \%}}{\text{Sodium Utilization, \%}}$$

A NSR=1 for a flue gas desulfurization treatment indicates that for every one mole of sulfur dioxide present in the flue gas stream being treated, there is also present one mole of available sodium ($Na_2$) in the dry sorbent.

An efficient dry sorbent is one in which the target percentage of $SO_2$ removed from the flue gas stream is maximized, and concurrently the sorbent is fully utilized during the desulfurization treatment process, i.e., substantially all available sodium is reacted with $SO_2$.

The amount of dry sorbent introduced into contact with the flue gas stream must be adjusted to provide for good utilization of the sorbent, while concurrently achieving the desired $SO_2$ removal objectives. In the dry injection process of this invention, a substantial portion of the sorbent's sodium content, i.e., at least 40% and preferably at least 50% of the sodium content of the injected dry sorbent, is utilized, i.e., reacted with sulfur oxides, during the desulfurization procedure at a normalized stoichiometric ratio (NSR) of 1. The preferred higher sodium utilization of 50%, and even 60% at a NSR=1, are readily obtained in this invention with dry soda sorbents derived from calcination of sodium bicarbonate.

Contact time of the dry sorbent with the $SO_2$-containing gas stream must likewise be adequately long to allow for absorption/reaction of the sulfur oxides by the dry sorbent and thereby provide the desired degree of sorbent utilization and sulfur dioxide removal. The cycle times for the solids-collection devices described above are ordinarily sufficient in duration to result in a substantial portion (40 to 50%, or more) of the sorbent sodium content being utilized at a NSR=1. From the known relationship between sodium utilization, $SO_2$ removal efficiency, and NSR (described above), it should be evident that sodium utilizations of 40% and 50%, at a NSR=1, correspond to $SO_2$ removal efficiencies of 40 and 50%, respectively.

The absorptive soda ash sorbents used in the method of this invention are obtained by calcination of any of several $NaHCO_3$-containing compounds. These $NaHCO_3$-containing compounds may be natural ores or refined or synthetically-prepared compounds. Because sorbents for dry injection FGD need not have high purity, the natural ores of the $NaHCO_3$-containing compounds are a preferred source of the calcine for use in this invention.

Sodium sesquicarbonate ($Na_2CO_3 \cdot NaHCO_3 \cdot 2H_2O$) in the form of its mineral ore, trona, that exists in large deposits in southwest Wyoming, is a preferred $NaHCO_3$-containing compound. The impurities commonly associated with trona ore deposits, e.g., $NaCl$, $Na_2SO_4$, shale, etc., do not adversely affect the performance of the calcined ore as a dry sorbent for FGD. Relatively pure trona, containing from 5–15 wt % impurities or less is preferably used to prepare the calcined sorbent, but less pure trona containing up to 20–30 wt % or more impurities can satisfactorily be used.

The purer forms of trona ore are preferred since the proportion of associated shale in the ore is minimized. Large amounts of shale are undesirable in the calcined sorbent because shale is simply inactive "dead weight" which does not function in a $SO_2$-removing capacity.

The calcined sorbent may also be satisfactorily prepared from sodium sesquicarbonate in forms other than trona ore. Sodium sesquicarbonate "green cake," a sodium sesquicarbonate crystalline intermediate in the "sesqui" process for manufacturing refined soda ash from trona ore, is one such source. Green cake typically contains at least 98 wt % sodium sesquicarbonate. Refined sodium sesquicarbonate can also be used but offers no significant improvement in FGD performance over green cake, when the two calcined materials are compared.

Sodium bicarbonate ($NaHCO_3$) is also suitable for use in preparing a porous dry soda sorbent. Highly preferred are impure forms of sodium bicarbonate, such as nahcolite ore. Other sources of sodium bicarbonate, desirably containing no more than 10 wt % impurities (non-$NaHCO_3$ compounds), are equally satisfactory.

Wegscheider's salt ($3NaHCO_3 \cdot Na_2CO_3$) is likewise another $NaHCO_3$-containing compound from which a suitable porous calcine may be prepared for use in the method of this invention.

Mixtures of these $NaHCO_3$-containing compounds may also be employed. Trona ore, for example, is often found intermingled with nahcolite ore in the Green River ore deposits and the combined ores may be recovered by mechanical mining for use in this method.

Regardless of its source, the uncalcined compound preferably contains no more than a small proportion of impurities, i.e., compounds other than the $NaHCO_3$-containing compound, preferably less than 15 wt % impurities, more preferably less than 5 wt % impurities.

Any of these $NaHCO_3$-containing compounds may be calcined, e.g., in a fluid bed calciner, to yield a highly-efficient soda ash sorbent suitable for the dry injection FGD process of this invention. Calcination of these precursor compounds results in the calcine/sorbent having been freed of its "surplus" carbon dioxide and water content during the calcination. A soda ash calcine having at least 85 wt % $Na_2CO_3$ is preferred, 90 wt % $Na_2CO_3$ is more preferred, and 95 wt % $Na_2CO_3$ and higher is most preferred. Such preferred sorbents contain minimal dead weight and can be economically shipped to remote utility sites.

The soda sorbents employed in this invention are remarkable in that despite having the "surplus" weight of $CO_2$ and $H_2O$ removed from their $NaHCO_3$-containing precursor, such calcined soda ash compositions are nevertheless highly efficient dry injection FGD sorbents. This is particularly so when the FGD efficiency of the calcine sorbent is measured on the basis of the sorbent's total weight.

The dry soda-type sorbent used in the process of this invention must be in particulate or powdered form, so as to facilitate its injection and fluidization (entrainment) in the flue gas stream.

The suitable $NaHCO_3$-containing precursor compound from which the soda-type sorbent is derived may accordingly be reduced to particulate form, as necessary, either before or after its calcination. Sizing of the uncalcined material, prior to its calcination, is subject only to the operational constraints of the calciner equipment used. The sizing of the $NaHCO_3$-containing compound, prior to its calcination, desirably is such that the biggest pieces are no larger than 1 cm in size, and the mean particle size is less than No. 20 (850 μm) sieve. The coarse sized compound may be crushed further to a desired smaller particulate sizing either before or after its calcination.

The approximate particulate sizing desired for the soda ash sorbent product is preferably obtained by size reduction or screening of the feed source prior to its calcination, taking into account any size change that may result during calcination.

In any event, it has been discovered that particle sizing of the $NaHCO_3$-containing feed material that is subjected to calcination is not critical, insofar as the porosity characteristics of the calcine are concerned. The particulate soda sorbent will have the desired physical and chemical FGD sorbent characteristics regardless of whether it is sized to the desired particle sizing either before or after its calcination.

The sizing of the dry soda ash sorbent, intended for use in the dry injection process of this invention, is desirably such that substantially all particles are less than No. 20 (850 μm) sieve. More preferably, substantially all particles are less than No. 100 (150 μm) sieve in size. The average particle size of the particulate soda ash product is preferably within the range of No. 100 (150 μm) sieve to No. 400 (38 μm) sieve, and more preferably is less than No. 270 (53 μm) sieve.

Extremely fine particle sizing, e.g., less than No. 400 (38 μm) sieve may also be used with good results. Drawbacks to the use of such fine sizing are that complex pulverizing equipment is required and that handling of the dusty material is difficult. When such finely-ground material is used as the injected sorbent, its desulfurization performance is nevertheless entirely satisfactory. Such finely-ground material is also readily recovered by the baghouse particulate collection systems presently used to remove fly ash from flue gas streams.

As mentioned earlier, the dry soda sorbent employed in this invention is obtained by calcination of one of the suitable $NaHCO_3$-containing sources described above. The $NaHCO_3$-containing feed source is preferably converted to a porous calcine in a fluidized bed calciner, but an indirect-heated rotary calciner or other similar types of calciners may also be used. Conventional fluid bed drying and/or calcination apparatus may be satisfactorily employed to produce the porous calcine of this invention. Continuous operation of the apparatus, as opposed to batchwise calcination, is preferred for ensuring that temperature conditions and the like within the calciner are precisely maintained during calcination at constant, steady state values over time.

Calcination temperature, i.e., the temperature of the solid material in the fluidized bed or cascade, is typically maintained within the range of 100° to 270° C. The temperature is desirably maintained at a relatively constant value, both throughout the bed itself and over time, so as to assure uniform calcination conditions for all particles introduced to the calciner during its operation.

When sodium sesquicarbonate is used as the particulate feed, the calcination temperature is preferably maintained within the range of 120°-160° C., more preferably 130°-150° C. When sodium bicarbonate is the particulate feed, on the other hand, then the calcination temperature range is preferably 150°-210° C., more preferably 170°-190° C.

Indirect heating is preferred for supplying heat to the solids being calcined. Indirect heating avoids high temperature differences between the heating medium and the solid particles, which can result in the particles becoming sintered during calcination and not having the desired absorptive characteristics needed for FGD application.

The heating surfaces of the indirect heating elements which are exposed to the particle bed in the calciner are desirably maintained below a surface temperature of 350° C.

Steam-heating to provide indirect heating through coils, tubes or other heat transfer surfaces, is preferred. Steam at a pressure of not more than 600 psi is preferred since it will have a temperature below 250° C.

Alternatives to steam for indirect heating include hot gas such as hot air or combustion gases. The heat flux with hot gas through the heating surfaces is much more readily controlled, as compared with steam, so that more precise control of the bed heating is possible.

For the preferred fluidized bed calciners, the fluidizing gas, along with the preferred indirect heating, may also provide a source of heat to the fluidized bed. The fluidizing gas may be used to supply direct heat input, by being maintained at a temperature above that of the fluidized bed. In any event, the temperature of the incoming fluidizing gas should not be significantly cooler than the fluidized bed temperature.

The fluidizing gas, just prior to its introduction to the fluid bed, is desirably maintained at a temperature below 350° C. More preferably, the temperature of the incoming fluidizing gas is selected so as to yield a difference in temperature between such incoming gas and within the fluidized bed of less than 100° C. This mode of operations assures gentle heating of the fluidized particles, along with uniform temperature conditions throughout the fluidized bed.

The fluidizing gas may be air, or combustion gas, or the like. Moisture, in amounts normally present in ambient air and in typical combustion gas compositions, may be contained in the fluidizing gas, since it has no adverse impact on the calcine porosity characteristics.

The residence time of the particulate material in the calciner, i.e., the average time that a particle remains exposed to calcination temperatures before being removed from the calciner, typically is within the range of from about 0.25 hour (15 minutes) to about 3 hours. Longer residence times are feasible but require extremely large sized calciners to accomodate the necessary volume for typical commercial production rates.

The calcination of the $NaHCO_3$-containing precursor should result in most of the bicarbonate content of the precursor compound being converted to carbonate. The residual bicarbonate content of the withdrawn calcine should be less than 10 wt % $NaHCO_3$, preferably less than 5 wt % $NaHCO_3$, and most preferably less than 2 wt % $NaHCO_3$. These residual bicarbonate limits should be measured on an impurities-free basis, i.e., based on the combined weight of $Na_2CO_3$ and $NaHCO_3$ in the calcine. Residual bicarbonate should be minimized so as to provide a porous soda ash calcine whose facility for absorbing $SO_2$ by dry injection FGD, based on mass of $SO_2$ removed per unit mass of sorbent, is maximized.

The porous calcine defined as suitable for use in this invention is characterized primarily by its relatively large surface area, which the inventors have discovered is essential for assuring good FGD performance. The calcined sorbent surface area must be at least 2 $m^2/g$ and preferably is at least 4 $m^2/g$. The maximum surface area is not critical but should not exceed a point at which the strength of the particulate calcine begins to deteriorate seriously and the solid becomes excessively friable.

The inventors have found that large pores, contrary to the prevailing wisdom among dry sorbent FGD experts, are neither desirable nor necessary for providing good FGD performance. Light density Solvay soda ash is characterized by having extremely larges pores (which facilitate its use in household laundry detergent formulations for absorbing liquid surfactants) but nevertheless does not exhibit good FGD performance as a dry sorbent.

Porous calcines suitable for use in this invention, having a mimimum surface area of at least 2 $m^2/g$, may have their porosity characteristics identified more precisely in either of two ways. Both approaches are simply methods by which the pore size distribution is specified quantitatively, it being understood that the large surface area is due to the existence of numerous small-to-moderate diameter pores in the porous, calcined sorbent.

In one alternative embodiment of the invention, the porous calcine is characterized by having a distribution and number of pores, with radii in the size range of 800-2200 Å, such that the surface area provided by these pores is at least 2 $m^2/g$. More preferably, the minimum surface area of 2 $m^2/g$ in the calcine is provided by a pore distribution in which the pore radii lie in the more narrow size range of 900-1400 Å. A further preferred embodiment is that the distribution and number of pores in these two pore size ranges provide a surface area of at least 4 $m^2/g$.

In another alternative embodiment of the invention, the porous calcine is characterized by having a ratio of surface area to total pore volume of at least 9 $\mu m^{-1}$, with the surface area being at least 2 $m^2/g$. More preferably, the ratio of surface area to total pore volume is in the range of 10 $\mu m^{-1}$ to 35 $\mu m^{-1}$.

The ratio of surface area (A) to total pore volume (V), it should be noted, may be construed as yielding the (inverse) value of an average pore size. The inventors, nevertheless, have elected not to describe the ratio A/V as an average or characteristics (inverse) pore size. The particulate solids employed in this invention possess a range of pore sizes or pore radii, and characterization of such solids by an "average" pore radius, defined by V/A, can be misleading without further explanation of its derivation.

Although this invention specifies a minimum total surface area for the particulate calcine of at least 2.0 $m^2/g$, pore volume is another parameter that may be used in lieu of surface area. In such event, the pore volume preferably should be at least 0.20 $cm^3/g$.

The physical characteristics that identify an acceptable porous calcine structure, for purposes of this invention, may readily be determined using conventional porosimetry procedures. The size and volume of pores in the porous solid employed in the method of this invention are desirably measured using a mercury penetration porosimeter.

The mercury porosimeter operates by forcing liquid mercury into the pore structure of a porous solid sample, by the controlled increase of hydrostatic pressure of the mercury in contact with the sample. Because the pressure required to fill a pore completely is in inverse proportion to the size (radius) of the pore, this controlled application of pressure may be correlated to pore size by the Washburn relationship:

$$pr = 2\gamma |\cos \theta|$$

where
p = pressure, $dynes/cm^2$
r = pore radius, cm
$\gamma$ = mercury surface tension, typically 480 dynes/cm
$\theta$ = contact angle of mercury with solid surface, typically 140°.

An applied pressure therefore corresponds to a distinct pore radius; the higher the applied pressure, the smaller the pore radius. Measurement of the amount or volume of mercury that penetrates or intrudes into the porous structure, as applied pressure in increased, yields pore size distribution data and, eventually, total pore volume for the solid sample measured.

A mercury porosimeter procedure that may be used for porosimetry measurements in the present invention is that described in Sections 106-114 of ASTM Standard C699-72, (which although directed to testing beryllium oxide powder is nevertheless applicable to the particulate calcines produced in this invention). One important difference, however, is that the pore size distribution in the present invention only utilizes pressures measured above atmospheric pressure; porosimetry data obtained at pressures below atmospheric pressure, used in the ASTM Standard to determine total pore volume, are not employed in the determination of pore size distribution and total pore volume for the calcine employed in the method of this invention.

The pore characteristics specified above in the alternative embodiments of the invention are based on pore size distribution data which utilize an applied pressure range of 24 psia to 33,000 psia. The use of 24 psia as a cut-off (with larger pores corresponding to mercury intrusion below this pressure not being included in the total pore volume or pore size distribution) is an arbitrary one, but one which is conventionally accepted and which follows the procedure established in the pioneering mercury porosimetry work of Ritter and Drake (H. L. Ritter, et al., *Ind. Eng. Chem. Anal. Ed.*, 17, 782–791 (1945)).

A value for overall surface area may be determined from the porosimetry data, i.e., the pore size distribution data and pore volume data, from the following relationship:

$$S = \frac{1}{\gamma |\cos\theta|} \int_0^v p\, dv$$

where
p = pressure, dynes/cm$^2$
dv = differential volume, cm$^3$
$\gamma$ = mercury surface tension, typically 480 dynes/cm
$\theta$ = contact angle of mercury with solid surface, typically 140°.

Using the pressure-volume curves resulting from the porosimetry analysis, total surface area (based on the range of pressures utilized during porosimetry) can be evaluated by graphical integration of the experimental data.

Surface area may also be determined, for purposes of this invention, by using the standard Brunauer, Emmett and Teller technique, commonly referred to as the B.E.T. method (S. Brunauer et al., *J.Am.Chem.Soc.* 60, 309 (1938)). The B.E.T. method measures surface area of a porous solid by low-temperature gas absorption. Nitrogen gas is the preferred absorbate for B.E.T. surface area measurements of the absorptive calcine produced in this invention. The inventors have found that surface area measurements determined from mercury porosimetry data compare closely with measurements obtained via the B.E.T. technique, the B.E.T. value typically being 5–10% higher than the corresponding mercury porosimetry values. The best correlations are obtained, with mercury porosimetry data, when surface area is measured as the (cumulative) surface area determined at a (cumulative) pore volume representing 90% of the total pore volume.

Another caveat about pore size distribution measurements should also be noted. It has been discovered that the pore size distribution measured for a newly-prepared calcine may undergo a shift over time, when the calcine is subsequently exposed to water vapor for long periods. While such pore size changes are generally minor over a few days' period, exposure of the calcine to an atmosphere with a relative humidity of 10% or more over a few weeks' or months' time will cause a significant deterioration in the numbers of small- to moderate-sized pores (800–2000 Å range) and an apparent shift in the pore distribution to larger-sized pores. This pore size distribution shift affects the pore surface area, causing it to decrease from initial values measured in freshly-prepared calcines. These changes, however, appear to have minimal impact on the measured total pore volume of a calcine.

The flue gas desulfurization method of this invention, and its calcined soda ash sorbents, possess numerous advantages over prior art FGD dry injection methods using uncalcined sorbents.

The dry sorbents in this invention possess minimal dead weight, since calcination of the NaHCO$_3$-containing precursor removes carbon dioxide and water, neither of which act as desulfurization agents. These soda ash sorbents provide the desired SO$_2$ removal efficiency without sacrifice in the sodium utilization of the dry sorbent.

The good sodium utilizations obtainable with these calcined sorbents results in the quantity of sorbent required to remove the "target" amount of SO$_2$ being kept small. As a consequence, the amount of SO$_2$ removed per unit weight of dry sorbent is maximized, an advantage whose importance in commercial FGD operations cannot be stressed enough.

These dry FGD sorbents have a high FGD efficacy, based on sorbent weight. Because the NaHCO$_3$-containing compound used as feed material has been calcined, it carries minimal "dead" weight that is non-functional as an SO$_2$ sorbent. Unlike prior art calcined materials, the calcines employed in this invention nevertheless possess good efficiency as dry sorbents for FGD.

Another characteristic of the absorptive soda ash compositions used in this invention is that their rate of sorption in removing SO$_2$ from a flue gas stream is very rapid. Sorption of SO$_2$ from the flue gas begins almost immediately upon injection of the dry sorbent into the gas stream. Uncalcined dry sorbents of the prior art, on the other hand, require much longer periods of exposure to the SO$_2$-containing flue gas stream to effect the desired sorption.

The porous calcines used as sorbents in the FGD process of this invention are versatile and may be used "as-is" under a wide range of stack gas conditions found in utilities. Unlike uncalcined sorbents, these porous calcines do not require high flue gas temperatures or large heat inputs to provide optimum sorbent performance when injected into a flue gas stream. The dry sorbent FGD method of this invention is thus readily applicable to existing utility baghouse collection facilities, without excessive equipment modification being required.

The particulate calcined materials used in this invention exhibit good flowability and are not dusty, which facilitate their handling during shipping and use as FGD sorbents.

The Examples which follow are illustrative of the invention and its critical elements.

EXAMPLES

Figure 1:
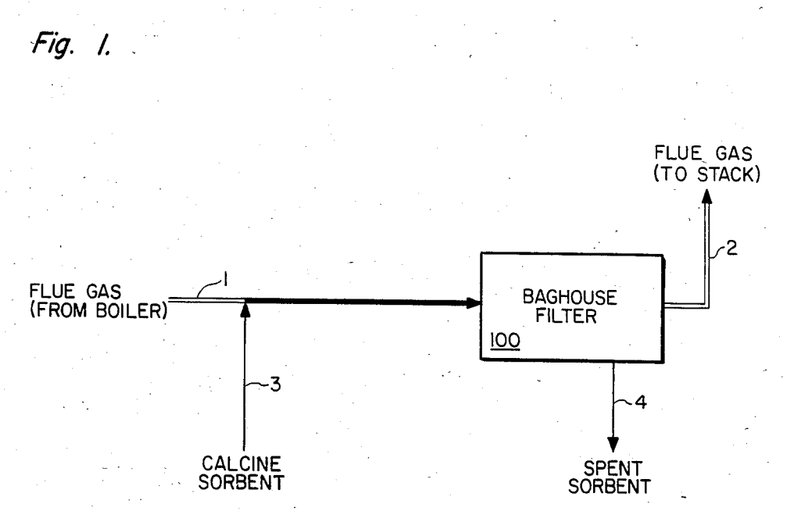
FIG. 1 is a schematic flow diagram depicting a dry injection flue gas desulfurization process operated in an embodiment of this invention.

Among the various examples described below, Example 1 illustrates a full-scale dry injection flue gas desulfurization process that employs calcined sodium bicarbonate as the porous soda ash dry sorbent, and FIG. 1 is a schematic flow diagram of the FGD process.

Figure 2:
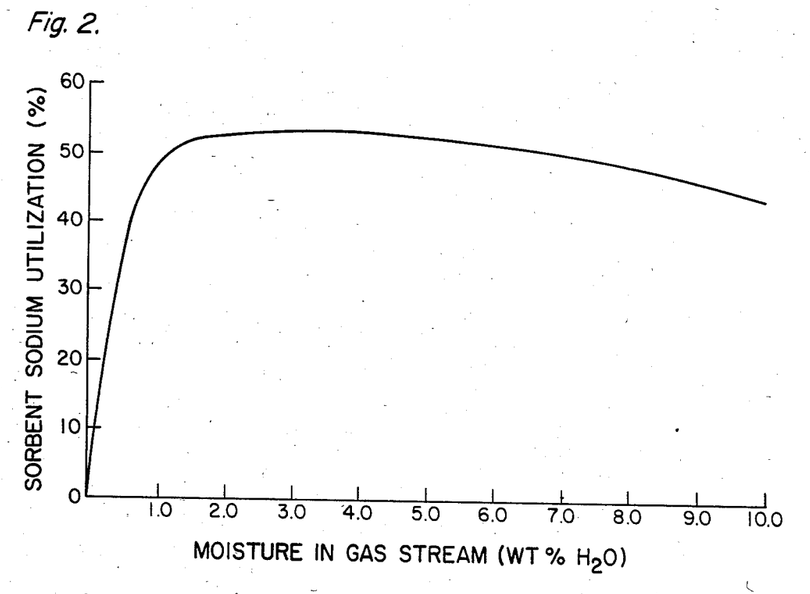
FIG. 2 is a plot showing the effect of moisture in the flue gas stream on desulfurization performance, measured as sorbent sodium utilization, for a calcined sodium sesquicarbonate sorbent.

Example 2 describes the evaluation of a calcined sodium sesquicarbonate sorbent in a laboratory-scale fluidized bed used to simulate a dry injection FGD process, and its results, shown in FIG. 2, illustrate the critical importance of the flue gas moisture levels specified in the claimed process for ensuring good sorbent FGD performance.

Example 3, which uses the same sorbent and apparatus as in Example 2, illustrates the sensitivity of sorbent FGD performance to flue gas temperature during gas-sorbent contact in the process of the invention.

EXAMPLE 1

Example 1 simulates a full-scale utility operation employing calcined sodium bicarbonate as the sorbent in the dry injection flue gas desulfurization process of this invention, for treating the $SO_2$-containing flue gas stream from the power plant boiler, and is based on data obtained from laboratory-scale work.

Referring now to FIG. 1, a hot flue gas stream 1 from a utility boiler, at a temperature of about 130° C., is passed through a baghouse filter 100 and the particulate-free hot gas 2 is vented to the atmosphere through a stack. The flue gas stream 1 flows at a rate of about 137,000 lb/hr through duct work that yields a linear velocity for the gas stream in excess of 15 ft/sec.

The gas stream 1 contains entrained fly ash solids in an amount of about 1 wt % and is also contaminated with 870 ppm sulfur dioxide. Substantially all of the fly ash is removed in the baghouse filters. The baghouse 100 is a pulse jet type, with a cycle time of ninety minutes. Temperature of the hot gas passing through the baghouse remains relatively constant, at 130° C.

The sulfur dioxide level, in this Example, is reduced from 870 ppm in incoming gas stream 1 to about 260 ppm in the existing gas stream 2, a 70% removal efficiency.

Desulfurization is accomplished in Example 1 by injecting calcined sodium bicarbonate sorbent 3 into the flue gas stream 1 at a rate of 230 lb/hr (100 lb/hr Na basis). The sorbent feed 3 is a particulate material, all less than No. 140 sieve in size, and is at ambient temperature, i.e., 25° C. Because the flue gas stream 1 contains moisture in an amount of 5 wt % $H_2O$, no additional water is required to be injected into the gas stream along with the sorbent.

The dry soda ash sorbent 3 is a calcined sodium bicarbonate, having a surface area of 6.6 $m^2/g$ and no residual bicarbonate content. It is prepared from sodium bicarbonate which is calcined in a continuous-feed fluid bed calciner at a temperature of 150° C. with an average residence time of 60 minutes. The calcined material is further characterized by having a pore size distribution such that the pores in the range 900–1400 Å provide a surface area of 5.2 $m^2/g$ and a total surface area of 6.6 $m^2/g$. Pore volume of the porous soda ash is 0.36 $cm^3/g$, so that the ratio of A/V is 18 $\mu m^{-1}$.

Desulfurization of the hot gas stream 1 occurs while the injected sorbent 3 is entrained in the flowing gas stream, for a few seconds, and also while the flue gas passes through the filter cake (collected fly ash and sorbent) in the baghouse filters during the ninety-minute collection cycle.

Upon completion of the baghouse filter cycle, the fly ash-sorbent cake that has accumulated in the bag filters is automatically removed as stream 4. The baghouse filter cake is removed at an average rate of 1830 lb/hr. The removed dry filter cake 4 contains both fly ash (85 wt %) and spent sorbent (15 wt %) and is disposed of.

The dry injection process of this Example 1, which removes 70% of the $SO_2$ from the incoming flue gas stream, results in a utilization of sorbent in the discarded sorbent stream 4 of 88%, i.e., 88% of the sodium available for reaction in the feed 3 is in fact utilized in discarded stream 4. The normalized stoichiometric ratio (NSR) is 0.79.

EXAMPLE 2

The criticality of the moisture level in the $SO_2$-contaminated flue gas stream is illustrate in this Example.

A calcined sodium sesquicarbonate was employed as the porous soda ash sorbent. The particulate sorbent was characterized by having a total surface area of 3.78 $m^2/g$ (measured within one week of its calcination) and a residual bicarbonate content of 0.14 wt % $NaHCO_3$. Pore size distribution analysis of the sorbent indicated a total pore volume of 0.28 $cm^3/g$, so its A/V ratio was therefore 9.9 $\mu m^{-1}$. Sorbent pore area in the freshly-calcined sorbent due to pores in the size range of 800–2000 Å was 2.24 $m^2/g$; pore area due to pores in the size range of 900–1400 Å was 1.46 $m^2/g$.

The porous calcine had been prepared from sodium sesquicarbonate wet cake (filter cake) that was calcined in an indirect-heated rotary calciner, at a spill temperature of about 230° C. The calcine was screened for purposes of this Example to provide a narrow particle size range, all particles being smaller than No. 140 sieve but larger than No. 200 sieve.

The porous calcine was evaluated within one week after its calcination for flue gas desulfurization (FGD) performance using the procedure described below, under "Evaluation of Calcine as FGD Sorbent." Under otherwise uniform evaluation conditions, e.g., flue gas-sorbent contact temperature of 132° C., NSR=1, etc., the calcined sesquicarbonate sorbent was contacted with a simulated flue gas stream whose water content was varied within the range 0–10 wt % $H_2O$. Performance of the porous calcine as a dry sorbent, dry injection FGD, was measured by its sodium utilization efficiency.

Results, shown graphically in FIG. 2, indicate that only when the flue gas stream contained at least 0.5 wt % moisture was the sodium utilization acceptable, being above 40%, for a NSR=1. Optimum utilization, at least about 50% for this particular sorbent, occurred with a flue gas moisture content of from about 1–8 wt % $H_2O$. All of the results shown in FIG. 2 were obtained at a desulfurization temperature of 132° C.

Comparable results, i.e. a similarly shaped curve, were obtained when calcined sodium bicarbonate was used in lieu of the calcine sesquicarbonate, except that sodium utilization was substantially better for the bicarbonate, as compared with sesquicarbonate, in the moisture ranges specified for the claimed invention.

Evaluation of Calcine as FGD Sorbent

A laboratory-scale fluid bed apparatus was used in a standardized FGD procedure to evaluate the particulate, calcined sodium sesquicarbonate for its utility as a dry sorbent for desulfurizing an $SO_2$-containing gas stream.

The fluid bed scrubber was a vertically-disposed 7.5 cm OD×85 cm long Pyrex glass tube fitted with a 400 mesh stainless steel screen gas distribution plate at the bottom. At the top of the scrubber tube, a 400 mesh screen served to retain any gas entrained fines. Connected to the bottom of the glass tube scrubber below the gas distribution plate, was a vertically disposed 2.5 cm OD×50 cm Pyrex tube surrounded by a tube furnace. Fluidizing gas containing $SO_2$ was introduced to this entry tube/preheater section.

Gas scrubbing runs were operated batchwise to simulate the cyclic operation of a commercial baghouse filter. The calcine charge was typically 4 g. The batch calcine charge was loaded into the scrubber tube before flow of the preheated $SO_2$-containing fluidizing gas was begun to start the run. The particulate calcined material was sieved before FGD evaluation to obtain an uniform-sized sample for the FGD evaluation that was in the size range of No. 140 to No. 200 sieve.

The fluidizing gas was preheated air that contained a small percentage of sulfur dioxide, 800 ppm $SO_2$ (STP); this approximates a $SO_2$ level typically obtained in a flue gas stream from combustion of 1 wt % S coal. Water vapor in controlled amounts was also added to the fluidizing air, so that the gas contained moisture at various levels ranging from 0-10 wt % $H_2O$, as noted. The air flowrate was 30 l/min (STP). Gas flow rates were monitored precisely with a mass thermal flowmeter. Sulfur dioxide concentrations in both the inlet and outlet gas streams were monitored with an infrared spectrometer gas analyzer.

The fluidizing gas was preheated in the preheat section before it entered the scrubber tube. Bed temperature was maintained at 132° C., with precise temperature control being obtained by a thermocouple-controlled tube furnace that surrounded the scrubber tube.

To simulate the operation of a commercial-scale baghouse filter, the fluid bed scrubber runs were carried out batchwise with a residence time of thirty minutes. The amount of calcine charged to the bed, the $SO_2$-containing gas flowrate, and the residence time were each selected so as to yield a normalized stoichiometric ratio (NSR) for each run of about 1.0. A NSR=1 indicates that the calcine contained sufficient sodium carbonate to react stoichiometrically with all of the $SO_2$ available in the gas stream, which contacted the sorbent during the batch desulfurization run time period.

After completion of the run, the "spent" sorbent was analyzed for its sulfur content and the analytical data used to calculate sodium utilization for the calcine-sorbent. Sodium utilization efficiencies of at least 40% (for an NSR=1) were deemed acceptable and satisfactory; sodium utilization efficiencies of at least 50% were preferred, and efficiencies of at least 60% were more preferred (both at a NSR=1).

EXAMPLE 3

This example illustrates the effect of the desulfurization temperature, i.e., during sorbent-gas contact, on sorbent FGD performance in the process of this invention.

The calcined sorbent and FGD evaluation procedure for this example were the same as that of Example 2, except that the water level in the simulated flue gas was constant at 5 wt % $H_2O$ and flue gas temperature was varied over the range of 90°-195° C.

Figure 3:
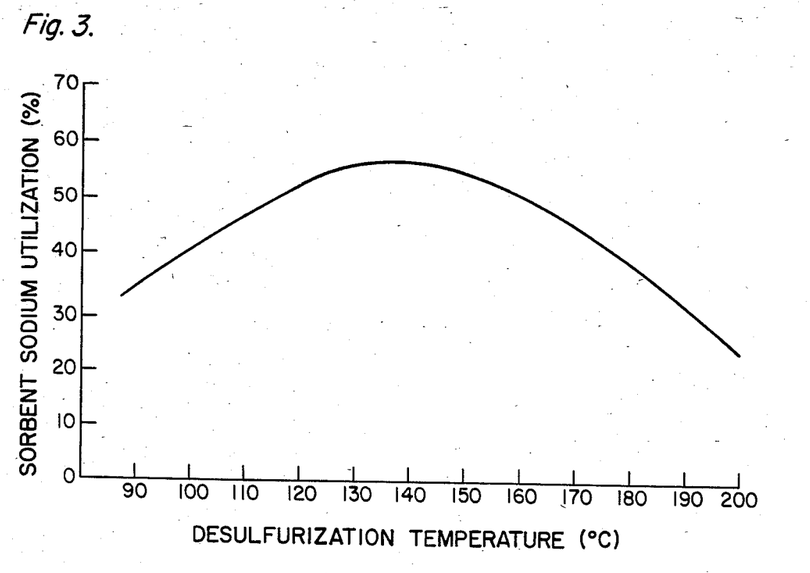
FIG. 3 is a plot showing the effect of desulfurization temperature on desulfurization performance, measured as sorbent sodium utilization, for a calcined sodium sesquicarbonate sorbent.

Sodium utilization efficiency of the calcined sodium sesquicarbonate sorbent was again used as a measure of the sorbent's FGD performance. Results indicate that good sodium utilizations, i.e., efficiencies above 50% for the calcined sesquicarbonate sorbent, were obtained when the desulfurization temperature was in the range 120°-160° C. FIG. 3 graphically illustrates the results, being a plot of sodium utilization efficiency as a function of desulfurization temperature.

The results shown in FIG. 3 were obtained at a moisture level of 5% $H_2O$ in the gas stream. The data in FIG. 2 suggest that similar results would be obtained at other moisture levels in the specified range of 0.5-10 wt % $H_2O$.

We claim:

1. A dry injection flue gas desulfurization process which comprises injecting a dry soda ash sorbent, which is a particulate solid derived from calcination under non-sintering conditions of a $NaHCO_3$-containing compound, into a $SO_2$-contaminated flue gas stream that contains moisture in an amount of 0.5-10 wt % $H_2O$ and is at a temperature of 100°-175° C.;

providing an amount of injected sorbent and sufficient gas-sorbent contact time such that a substantial portion, at least 40%, of the sorbent sodium content is utilized at a NSR=1, in reducing the concentration of $SO_2$ in the gas stream, collecting the sorbent in a solids-collection device which is a fabric filter baghouse or an electrostatic precipitator;

discharging collected sorbent from the solids-collection device;

the dry soda ash sorbent being a porous calcine obtained from calcination of sodium sesquicarbonate, sodium bicarbonate, Wegscheider's salt or mixtures of these, and further characterized by having a minimum surface area of at least 2 $m^2/g$ and a residual bicarbonate content of less than 10 wt % $NaHCO_3$.

2. A dry injection flue gas desulfurization process which comprises injecting a dry soda ash sorbent, which is a particulate solid derived from calcination under non-sintering conditions of a $NaHCO_3$-containing compound, into a $SO_2$-contaminated flue gas stream that contains moisture in an amount of 0.50-10 wt % $H_2O$ and is at a temperature of 100°-175° C.;

providing an amount of injected sorbent and sufficient gas-sorbent contact time such that a substantial portion, at least 40%, of the sorbent sodium content is utilized at a NSR=1, in reducing the concentration of $SO_2$ in the gas stream;

collecting the sorbent in a solids-collection device which is a fabric filter baghouse or an electrostatic precipitator;

discharging collected sorbent from the solids-collection device;

the dry soda ash sorbent being a porous calcine obtained from calcination of sodium sesquicarbonate, sodium bicarbonate, Wegscheider's salt or mixtures of these, and further characterized by having a sufficient number of pores with radii in the size range of 800-2000 Å to provide a minimum surface area in such pores of at least 2 $m^2/g$ and having a residual bicarbonate content of less than 10 wt % $NaHCO_3$.

3. The process of claim 2 wherein the porous soda ash sorbent has a sufficient number of pores with radii in the size range of 900-1400 Å to provide a minimum surface area in such pores of at least 2 $m^2/g$.

4. The process of claim 2 or 3 wherein the minimum surface area of the pores in the specified size range is at least 4 $m^2/g$.

5. A dry injection flue gas desulfurization process which comprises injecting a dry soda ash sorbent, which is a particulate solid derived from calcination under non-sintering conditions of a $NaHCO_3$-containing compound, into a $SO_2$-contaminated flue gas stream that contains moisture in an amount of 0.5-10 wt % $H_2O$ and is at a temperature of 100°-175° C.;

providing an amount of injected sorbent and sufficient gas-sorbent contact time such that a substantial amount, at least 40%, of the sorbent sodium content is utilized at a NSR=1, in reducing the concentration of $SO_2$ in the gas stream;

collecting the sorbent in a solids-collection device which is a fabric filter baghouse or an electrostatic precipitator;

discharging collected sorbent from the solids-collection device;

the dry soda ash sorbent being a porous calcine obtained from calcination of sodium sesquicarbonate, sodium bicarbonate, Wegscheider's salt or mixtures of these, and further characterized by having a porous structure whose ratio of surface area to total pore volume is at least 9 $\mu m^{-1}$ and whose surface area is at least 2 $m^2/g$ and having a residual bicarbonate content of less than 10 wt % $NaHCO_3$.

6. The process of claim 5 wherein the porous soda sorbent has a ratio of surface area to total pore volume in the range of 10 $\mu m^{-1}$ to 35 $\mu m^{-1}$.

7. The process of claim 1, 2, or 5 wherein the $SO_2$-contaminated flue gas stream contains up to 1 vol. % $SO_2$.

8. The process of claim 7 wherein the flue gas stream contains from 0.01-0.5 vol % $SO_2$.

9. The process of claim 7 wherein the flue gas stream contains from 0.02-0.2 vol % $SO_2$.

10. The process of claim 1, 2, or 5 wherein the moisture content of the $SO_2$-contaminated flue gas stream is maintained within the range of 1-8 wt % $H_2O$.

11. The process of claim 1, 2, or 5 wherein the porous soda ash sorbent has a residual bicarbonate content of less than 5 wt % $NaHCO_3$.

12. The process of claim 1, 2 or 5 wherein the flue gas temperature, during its contact with the sorbent, is within the range of 115°-165° C.

13. The process of claim 1, 2 or 5 wherein the flue gas temperature, during its contact with the sorbent, is within the range of 120°-150° C.

14. The process of claim 1, 2 or 5 wherein the calcined sorbent is derived from sodium sesquicarbonate.

15. The process of claim 14 wherein the flue gas temperature, during its contact with the sorbent, is within the range of 115°-165° C.

16. The process of claim 15 wherein the sorbent amount and sorbent-gas contact time are adjusted provide a sodium utilization of at least 50%, for a NSR=1.

17. The process of claim 1, 2, or 5 wherein the calcined sorbent is derived from sodium bicarbonate.

18. The process of claim 17 wherein the sorbent amount and sorbent-gas contact time are adjusted to provide a sodium utilization of at least 60% for a NSR=1.

19. The process of claim 1, 2, or 5 wherein the injected soda ash sorbent is collected in a baghouse filter and the collection period is from 0.25 to about 6 hours.

20. The process of claim 19 wherein the collection period is from 0.5 to about 3 hours.

21. The process of claim 1, 2, or 5 wherein the injected soda ash sorbent is collected in the electrostatic precipitator.

22. The process of claim 1, 2, or 5 wherein the particulate soda ash sorbent has a particle sizing that is substantially all smaller than about No. 20 sieve.

23. The process of claim 1, 2 or 5 wherein the particulate soda ash sorbent has a particle sizing that is substantially all smaller than about No. 100 sieve.

24. The process of claim 1, 2, or 5 wherein the particulate soda ash sorbent has an average particle size that lies between No. 100 sieve and No. 400 sieve.

25. The process of claim 1, 2, or 5 wherein the particulate soda ash sorbent has an average particle size that is less than No. 270 sieve.

* * * * *

UNITED STATES PATENT AND TRADEMARK OFFICE
CERTIFICATE OF CORRECTION

PATENT NO. : 4,588,569
DATED : May 13, 1986
INVENTOR(S) : Michael J. Cyran & William C. Copenhafer It is certified that error appears in the above—identified patent and that said Letters Patent is hereby corrected as shown below:

In claims 1, 2 and 5, lines 4-5 thereof of each claim, delete "under non-sintering conditions". In claims 1, 2 and 5, lines 19-20 thereof of each claim should read: --the dry soda ash sorbent being a porous calcine obtained from calcination under non-sintering conditions of sodium sesquicarbonate,--.

Signed and Sealed this

Seventh Day of October, 1986

[SEAL]

Attest:

DONALD J. QUIGG

Attesting Officer

Commissioner of Patents and Trademarks